US010914471B2

(12) United States Patent
Chon et al.

(10) Patent No.: US 10,914,471 B2
(45) Date of Patent: Feb. 9, 2021

(54) COMBUSTOR AND TRANSITION PIECE WITH LINERS HAVING ADJUSTABLE AIR INLET COVERS

(71) Applicant: DOOSAN HEAVY INDUSTRIES & CONSTRUCTION CO., LTD., Changwon-si (KR)

(72) Inventors: Muhwan Chon, Changwon-si (KR); Donggon Lee, Seoul (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 173 days.

(21) Appl. No.: 16/166,301

(22) Filed: Oct. 22, 2018

(65) Prior Publication Data
US 2019/0137102 A1  May 9, 2019

(30) Foreign Application Priority Data

Nov. 3, 2017 (KR) .................. 10-2017-0146151

(51) Int. Cl.
*F23R 3/04* (2006.01)
*F23R 3/26* (2006.01)
*F23R 3/06* (2006.01)

(52) U.S. Cl.
CPC .................. *F23R 3/04* (2013.01); *F23R 3/06* (2013.01); *F23R 3/26* (2013.01); *F05D 2240/35* (2013.01);
(Continued)

(58) Field of Classification Search
CPC .... F23R 3/002; F23R 3/04; F23R 3/06; F23R 3/07; F23R 3/16; F23R 3/26;
(Continued)

(56) References Cited

U.S. PATENT DOCUMENTS 3,958,413 A * 5/1976 Cornelius .............. F23R 3/14
60/778
4,872,312 A * 10/1989 Iizuka .................... F23R 3/002
60/760

(Continued)

FOREIGN PATENT DOCUMENTS

JP H08-135969 A 5/1996
JP 2011-102580 A 5/2011
(Continued)

*Primary Examiner* — William H Rodriguez
*Assistant Examiner* — David P. Olynick
(74) *Attorney, Agent, or Firm* — INVENSTONE Patent, LLC

(57) ABSTRACT

A combustor has a structure enabling selective control of the amount of air supplied to the liner and the transition piece and includes a liner having one end connected to a fuel injector, the liner comprising an inner liner surrounded by an outer liner having a first opening that is elongated in a circumferential direction of the outer liner and is configured to introduce cooling air into an annular space between the inner liner and the outer liner; a liner sliding cover configured to adjust an opening degree of the first opening; and a transition piece connected at one end to the other end of the liner and connected to a turbine at the other end, the transition piece having an effusion hole configured to supply cooling air to a combustion chamber, the effusion hole having an opening area that is less than the opening degree of the first opening.

18 Claims, 8 Drawing Sheets

(52) U.S. Cl.
CPC ............... *F05D 2260/203* (2013.01); *F23R 2900/03043* (2013.01)

(58) Field of Classification Search
CPC .......... F23R 2900/03041–03044; F01D 9/023; F24F 13/12
See application file for complete search history.

(56) References Cited

U.S. PATENT DOCUMENTS

| | | | | |
|---|---|---|---|---|
| 5,317,863 | A * | 6/1994 | Ciccia | F23R 3/26 |
| | | | | 60/39.23 |
| 5,557,920 | A * | 9/1996 | Kain | F23R 3/26 |
| | | | | 60/39.23 |
| 6,948,641 | B1 * | 9/2005 | Williams | G01F 11/261 |
| | | | | 222/456 |
| 7,631,504 | B2 * | 12/2009 | Belsom | F01D 9/023 |
| | | | | 60/39.23 |
| 2010/0229564 | A1 * | 9/2010 | Chila | F23R 3/06 |
| | | | | 60/752 |
| 2016/0102864 | A1 * | 4/2016 | Metternich | F23R 3/02 |
| | | | | 60/772 |
| 2017/0176014 | A1 * | 6/2017 | Hughes | F01D 9/041 |

FOREIGN PATENT DOCUMENTS

| | | |
|---|---|---|
| KR | 10-2006-0087872 A | 8/2006 |
| KR | 10-2010-0055012 A | 5/2010 |
| KR | 10-1438106 B1 | 9/2014 |
| KR | 10-1541425 B1 | 8/2015 |
| KR | 10-1770068 B1 | 8/2017 |

\* cited by examiner

COMBUSTOR AND TRANSITION PIECE WITH LINERS HAVING ADJUSTABLE AIR INLET COVERS

CROSS-REFERENCE TO RELATED APPLICATIONS

This application claims priority to Korean Patent Application No. 10-2017-0146151, filed on Nov. 3, 2017, the disclosure of which is incorporated herein by reference in its entirety.

BACKGROUND OF THE INVENTION

Field of the Invention

Exemplary embodiments of the present disclosure relate to a combustor and a gas turbine including the same.

Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, and the like.

This gas turbine typically includes a compressor, a combustor, and a turbine. The compressor sucks and compresses outside air, and then transmits it to the combustor. The air compressed in the compressor is in a high-pressure and high-temperature state. The combustor mixes the compressed air introduced from the compressor with fuel and burns the mixture. Combustion gas produced by the combustion is discharged to the turbine. Turbine blades in the turbine are rotated by the combustion gas, thereby generating power. The generated power is used in various fields, such as generating electric power and driving machines.

The combustor is provided with a combustion duct assembly that transmits high-temperature combustion gas produced in a combustion chamber to the turbine. The combustion duct assembly includes a liner and a transition piece connected to the liner to guide the produced combustion gas to the turbine, and a nozzle part and a head part are installed over the liner.

In this case, the liner and the transition piece each have a double-tube structure, and it is necessary to cool the inner side of the structure, which directly contacts the high-temperature combustion gas in the combustion chamber. Impinging jet cooling is representatively used to cool the liner and the transition piece. The impinging jet cooling is a method of indirectly lowering the temperature of the liner and the transition piece by injecting jets of cooling fluid onto their outer surfaces coming into direct contact with hot combustion gas.

However, in the impinging jet cooling, it is difficult to form holes or slopes in the liner and the transition piece or to render their shapes in order to guide an airflow in a particular direction, since each of the tubular liner and transition piece has a thin thickness. Therefore, there is a need for countermeasures.

SUMMARY OF THE INVENTION

The present disclosure has been made in view of the above-mentioned problems, and an object thereof is to provide a combustor capable of controlling an amount of cooling air supplied to each of a liner and a transition piece, and a gas turbine including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a combustor may include a liner having one end configured to be connected to a fuel injector, the liner comprising an inner liner surrounded by an outer liner having a first opening that is elongated in a circumferential direction of the outer liner and is configured to introduce cooling air into an annular space between the inner liner and the outer liner; a liner sliding cover configured to adjust an opening degree of the first opening; and a transition piece connected at one end to the other end of the liner and configured to be connected to a turbine at the other end, the transition piece having an effusion hole configured to supply cooling air to a combustion chamber, the effusion hole having an opening area that is less than the opening degree of the first opening.

The combustor may further include a connection part formed as an annular partition wall to define a gap between the inner liner and the transition piece and to define the annular space of the liner as an independent space.

The combustor may further include a first annular guide having a first slope formed on one side to guide the cooling air introduced through the first opening to the fuel injector. The first annular guide may extend from an annular partition wall that defines a gap between the inner liner and the transition piece and defines the annular space of the liner as an independent space, and the first opening may be disposed toward the annular partition wall.

The first opening may have a flat-sided oval shape and may include opposing side surfaces communicating with an upper surface of the outer liner; and a first slot longitudinally formed in each opposing side surface. The first slot may have a longitudinal length to accommodate the adjustment of the opening degree of the first opening. The liner sliding cover may include a cover body having a second slot formed to face the first slot; a ball inserted in the first slot; and an elastic member fixed at one end to the second slot and configured at the other end to elastically support the ball against the first slot. The elastic member may include a coil spring. The first opening may further include opposing end surfaces that communicate with the opposing side surfaces. The opposing side surfaces of the first opening may receive opposite side surfaces of the cover body when the elastic member elastically supports the ball against the first slot, and the opposing end surfaces of the first opening may receive one opposite end surface of the cover body when the liner sliding cover adjusts the opening degree of the first opening to an extreme. The first opening and the cover body may each have a flat-sided oval shape, and the first opening may be longer than the cover body.

An amount ($X1$) of cooling air introduced through the first opening for a specific time may be greater than an amount ($X2$) of cooling air supplied through the effusion hole for the specific time, and it may be assumed that a sum ($X1+X2$) of the amounts of cooling air is equal to one, such that a statement of $0<X2<0.5$ is true.

The combustor may further include a series of markers formed in the outer liner in a longitudinal direction of the first opening that are arranged to visually indicate an amount of movement of the liner sliding cover corresponding to an adjusted opening degree of the first opening.

In accordance with another aspect of the present disclosure, a combustor may include a liner having one end configured to be connected to a fuel injector, the liner comprising an inner liner surrounded by an outer liner having a first opening that is elongated in a circumferential direction of the outer liner and is configured to introduce cooling air into an annular space between the inner liner and the outer liner; a transition piece connected at one end to the other end of the liner and configured to be connected to a turbine at the other end, the transition piece comprising an inner transition piece surrounded by an outer transition piece having a second opening that is elongated in a circumferential direction of the outer transition piece and is configured to introduce cooling air into an annular space between the inner transition piece and the outer transition piece, the inner transition piece having an effusion hole disposed downstream of the second opening and configured to supply the cooling air introduced through the second opening to a combustion chamber; a liner sliding cover configured to adjust an opening degree of the first opening to impart the first opening with a predetermined opening area; and a transition piece sliding cover configured to adjust an opening degree of the second opening to impart the second opening with a predetermined opening area, such that the first and second openings have opening areas respectively set according to a specific ratio of the opening areas.

The annular space between the inner transition piece and the outer transition piece may have a reduced cross-sectional area toward the turbine so as to control a flow rate of the cooling air supplied through the effusion hole.

The combustor may further include a first annular guide having a first slope formed on one side to guide the cooling air introduced through the first opening to the fuel injector; and a second annular guide having a second slope formed on one side to guide the cooling air introduced through the second opening to the turbine. The first and second annular guides may extend from an annular partition wall that defines a gap between the inner liner and the transition piece and defines the annular spaces of the liner and the transition piece as independent spaces, and the first and second openings may be respectively disposed toward the annular partition wall.

The first and second openings may each have a flat-sided oval shape, wherein the first opening includes opposing side surfaces communicating with an upper surface of the outer liner; and a first slot longitudinally formed in each opposing side surface of the first opening. The first slot of the first opening may have a longitudinal length to accommodate the adjustment of the opening degree of the first opening. The second opening may include opposing side surfaces communicating with an upper surface of the outer transition piece; and a first slot longitudinally formed in each opposing side surface of the second opening. The first slot of the second opening may have a longitudinal length to accommodate the adjustment of the opening degree of the second opening. Each of the liner sliding cover and the transition piece sliding cover may include a cover body having a second slot formed to face a corresponding first slot; a ball inserted in the corresponding first slot; and an elastic member fixed at one end to the second slot and configured at the other end to elastically support the ball against the corresponding first slot.

The combustor may further include a first series of markers formed in the outer liner in a longitudinal direction of the first opening that are arranged to visually indicate an amount of movement of the liner sliding cover corresponding to an adjusted opening degree of the first opening; and a second series of markers formed in the outer transition piece in a longitudinal direction of the second opening that are arranged to visually indicate an amount of movement of the transition piece sliding cover corresponding to an adjusted opening degree of the second opening.

An amount (X1) of cooling air introduced through the first opening for a specific time may be greater than an amount (X2) of cooling air introduced through the second opening for the specific time, and it may be assumed that a sum (X1+X2) of the amounts of cooling air is equal to one, such that a statement of 0<X2<0.5 is true.

In accordance with a further aspect of the present disclosure, there is provided a gas turbine including a compressor to compress air, a combustor to produce combustion gas by mixing the compressed air with fuel for combustion, and a turbine rotated by the combustion gas to generate power. The combustor of the gas turbine is consistent with either of the above-described combustors.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
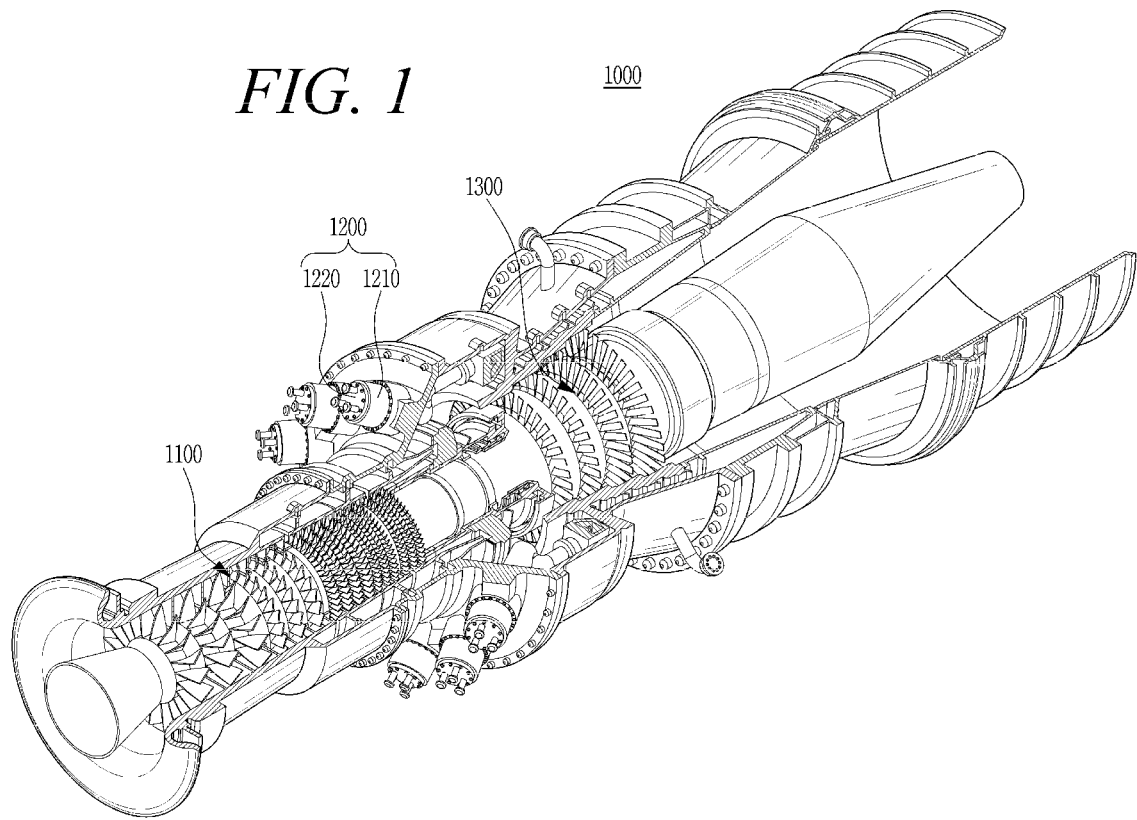
FIG. 1 is a cutaway perspective view of a gas turbine which may include a combustor according to an embodiment of the present disclosure.

The present disclosure may be subjected to various modifications and have various embodiments. Specific embodiments are illustrated in the drawings and will be described in the detailed description of the present disclosure. However, this is not intended to limit the present disclosure to specific embodiments. It should be understood that the present disclosure includes all modifications, equivalents or replacements that fall within the spirit and technical range of the present disclosure, and the scope of the present disclosure is not limited to the following embodiments.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present disclosure will be described below in more detail with reference to the accompanying drawings. Throughout the disclosure, like reference numerals refer to like parts throughout the various figures and embodiments of the present disclosure. In certain embodiments, detailed descriptions of functions and configurations well known in the art may be omitted to avoid obscuring appreciation of the disclosure by a person of ordinary skill in the art. For the same reason, some components may be exaggerated, omitted, or schematically illustrated in the accompanying drawings.

FIG. 1 illustrates the interior of a gas turbine 1000 which may include a combustor according to an embodiment of the present disclosure.

Referring to FIG. 1, a compressor 1100 of the gas turbine 1000 serves to suck and compress air, and mainly serves to supply cooling air to a high-temperature region required for cooling in the gas turbine 1000 while supplying combustion air to a combustor 1200. Since the air sucked into the compressor 1100 is subject to an adiabatic compression process, the pressure and temperature of the air passing through the compressor 1100 increase. The compressor 1100 of the relatively large gas turbine 1000 as in FIG. 1 is a multistage axial compressor configured such that a large amount of air is compressed to a desired compression ratio while passing through each stage.

The combustor 1200 mixes the compressed air, which is supplied from the outlet of the compressor 1100, with fuel for isobaric combustion to produce high-energy combustion gas. The combustor 1200 is disposed downstream of the compressor 1100 and includes a plurality of head parts 1220 arranged along an annular combustor casing 1210. Each of the head parts 1220 includes a plurality of fuel injectors 1222 (FIG. 2), and the fuel supplied from the fuel injectors 1222 is mixed with air at an appropriate rate to be suitable for combustion.

The gas turbine 1000 may use gas fuel, liquid fuel, or composite fuel combining them. It is important to make a combustion environment for reducing an amount of emission such as carbon monoxide or nitrogen oxide that is subject to legal regulations. Accordingly, pre-mixed combustion has been increasingly used in recent years in that it can accomplish uniform combustion to reduce emission by lowering a combustion temperature even though it is relatively difficult to control combustion.

Figure 2:
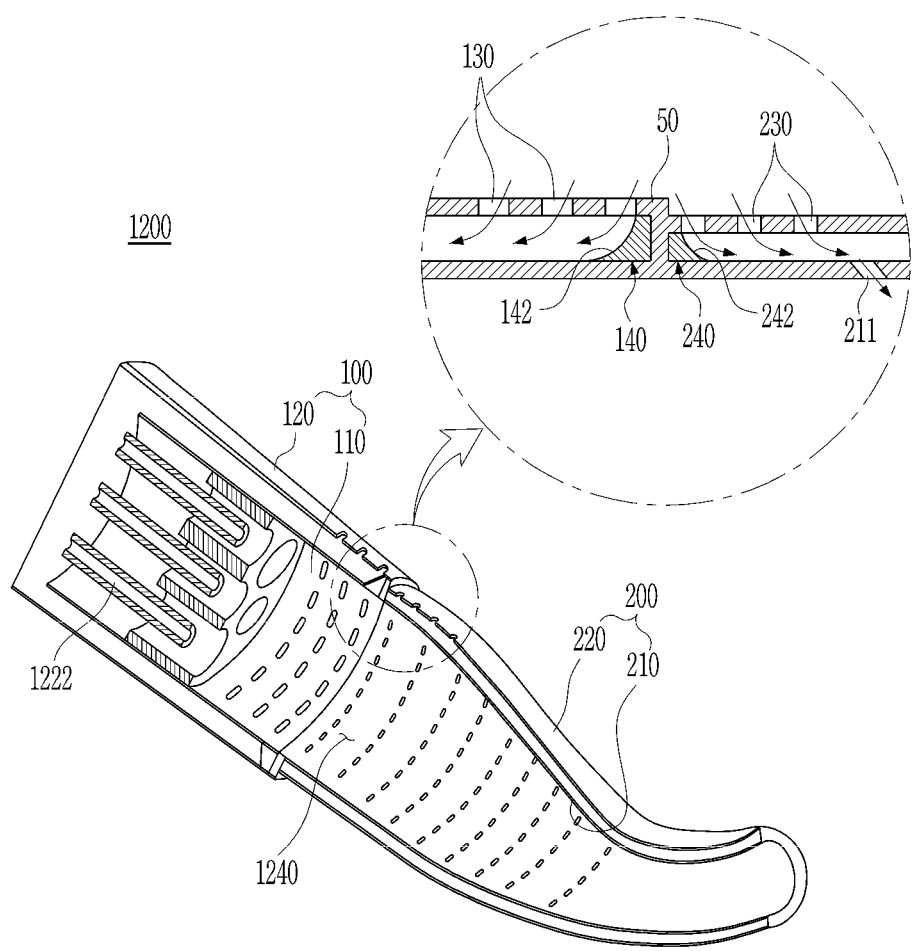
FIG. 2 is a cutaway perspective view of a combustor according to an embodiment of the present disclosure, including a callout showing a cross-section of the liner and transition piece each adjoining a connection part.

In the pre-mixed combustion, compressed air is mixed with the fuel injected from the fuel injectors 1222 and then introduced into a combustion chamber 1240 (FIG. 2). When combustion is stable after pre-mixed gas is initially ignited by an igniter, the combustion is maintained by the supply of fuel and air.

The combustor 1200 needs to be suitably cooled since it operates at the highest temperature in the gas turbine 1000. Especially, a turbine inlet temperature (TIT) is very important in the gas turbine 1000 because the efficiency of the gas turbine 1000 is typically increased as the turbine inlet temperature becomes high. In addition, the increase of the turbine inlet temperature is advantageous for gas turbine combined power generation. For this reason, the gas turbine 1000 is also classified based on the turbine inlet temperature.

Ultimately, the temperature of combustion gas must be increased to increase the turbine inlet temperature. Accordingly, it is important that a combustion duct assembly, which forms the combustion chamber 1240 and passage of the combustor 1200 for the flow of hot combustion gas, be designed to be made of a high heat-resistant material and desirably cooled.

Figure 3:
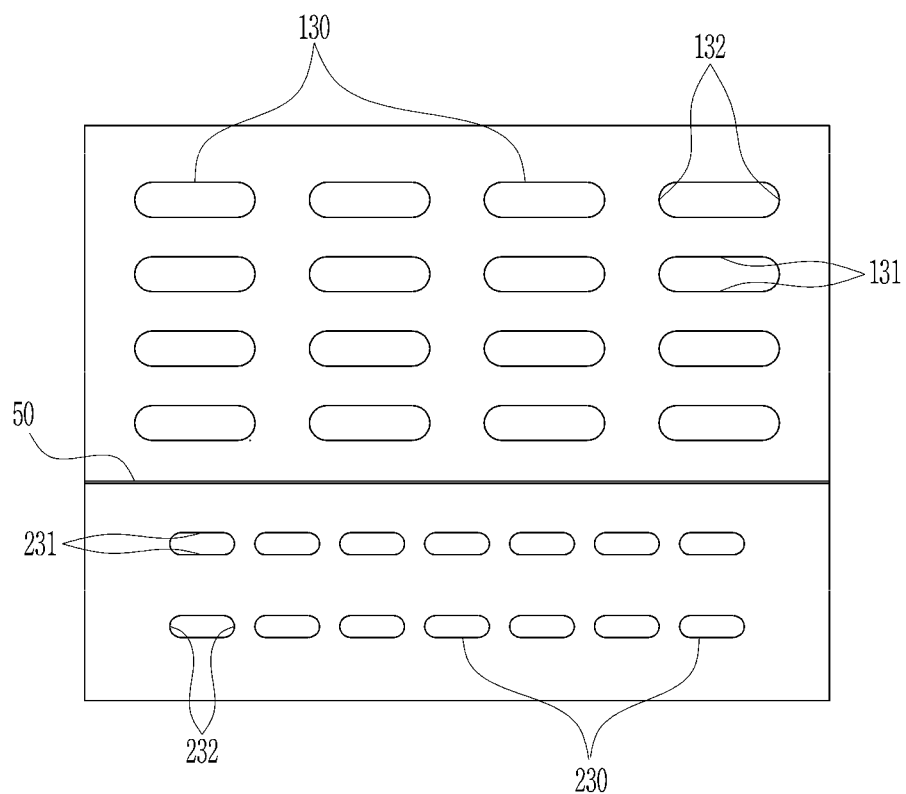
FIG. 3 is a top view illustrating the first and second openings of FIG. 2.
Figure 4:
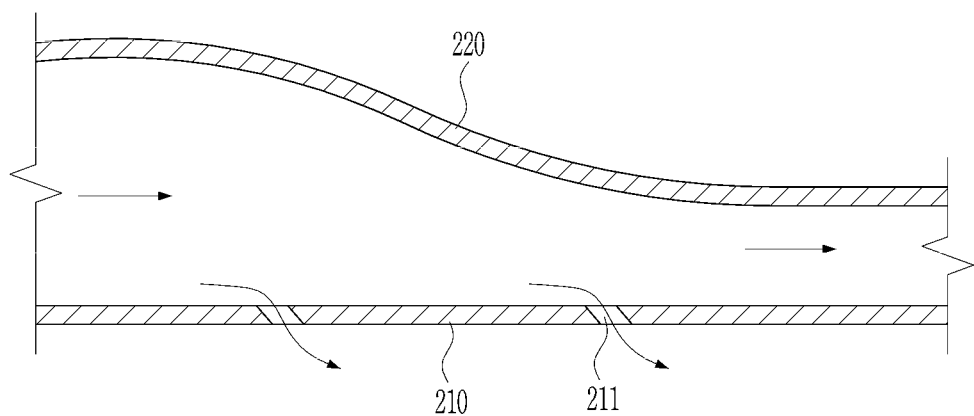
FIG. 4 is a cross-sectional view of a portion of the transition piece of FIG. 2 that extends toward a turbine.

FIGS. 2 to 4 illustrate the structure of a combustor 1200 according to an embodiment of the present disclosure, with FIG. 3 detailing the first and second openings and FIG. 4 illustrating an airflow state of the transition piece in the vicinity of the turbine 1300.

Referring to FIGS. 2 to 4, the combustor 1200 includes a liner 100 that includes an inner liner 110 and an outer liner 120; a transition piece 200 that is connected at one end to one end of the liner 100 and at the other end to the turbine and includes an inner transition piece 210 and an outer transition piece 220; a first opening 130 that is open and elongated in the circumferential direction of the outer liner 120 so that cooling air is introduced through the first opening 130, and a second opening 230 that is open and elongated in the circumferential direction of the outer transition piece 220 so that cooling air is introduced through the second opening 230. The first and second openings 130 and 230 have different opening area ratios.

A connection part 50 is disposed between the liner 100 and the transition piece 200.

The liner 100 has a hollow therein and the inner liner 110 has a cylindrical shape. The fuel injectors 1220 are disposed at one end of the inner liner 110.

The outer liner 120 is located outside the inner liner 110 while surrounding the inner liner 110, and has the first opening 130 formed in the vicinity of the connection part 50 connected to the transition piece 200 for introduction of cooling air.

The first opening 130 may consist of a plurality of first openings arranged in the circumferential direction of the outer liner 120 and may have an oval shape.

The transition piece 200 is heated to a predetermined temperature by hot gas produced in the combustion chamber 1240, and cooling air is therefore introduced into the transition piece 200 to cool the transition piece 200. This cooling air is simultaneously introduced into the liner 100, and the majority of the cooling air is used as combustion air for combustion while a portion of the cooling air is used to cool the liner 100.

The present disclosure includes the first and second openings 130 and 230 to control a flow rate of cooling air, and the flow rate may be controlled by adjusting the areas of the first and second openings 130 and 230 as a specific ratio.

The transition piece 200 includes the inner transition piece 210 connected to the inner liner 110 and the outer transition piece 220 connected to the outer liner 120.

The outer transition piece 220 has the second opening 230 that is open for introduction of cooling air thereinto. The inner transition piece 210 has an effusion hole 211 that is open to supply the cooling air, which is introduced through the second opening 230, into the inner transition piece 210.

The second opening 230 may consist of a plurality of second openings arranged in the circumferential direction of the outer transition piece 220 and may have an oval shape.

In the present embodiment, the first and second openings 130 and 230 have differently sized opening areas, and the opening area of the first opening 130 is greater than that of the second opening 230. The first opening 130 serves to supply combustion air to the fuel injectors 1220 and simultaneously to supply cooling air for cooling of the liner due to hot gas produced during combustion. For example, to stably operate the fuel injectors 1220, the majority of the cooling air supplied through the first opening 130 is used as combustion air for combustion and only a portion of the supplied cooling air is used for cooling.

That is, assuming that the amount of cooling air introduced through the first opening 130 for a specific time is X1, the amount of cooling air introduced through the second opening 230 for the specific time is X2, and the sum of the amounts of cooling air introduced through the first and second openings 130 and 230 for the specific time is equal to one, the statements X1>X2 and 0<X2<0.5 are true.

Thereby, it is possible to efficiently control a flow rate of cooling air supplied into the liner 100 and a flow rate of cooling air supplied into the transition piece 200 and to stably operate and cool the fuel injectors 1220 together.

Accordingly, compressed air may be optimally supplied into the liner 100 and the transition piece 200 by the opening areas of the first and second openings 130 and 230, which are respectively set according to a specific ratio of areas, and then used for combustion air or cooling air. In this case, it is possible to accurately set an optimal amount of air and supply it to the liner 100 and the transition piece 200 according to the capacity of the gas turbine.

As shown in FIG. 4, the diameter of the portion of the transition piece 200 connected to the outer liner 120 is reduced toward the end of the transition piece 200 connected to the turbine. That is, taking a perpendicularly cut cross-section across the axis of the transition piece 200, the cross-sectional area of an annular space between the inner transition piece 210 and the outer transition piece 220 is a reduced toward the turbine and then kept uniform toward the position adjacent to the turbine, and the diameter of the outer transition piece 220 is reduced toward the position adjacent to the turbine.

In this case, by adjusting the cross-sectional area of the annular space surrounding the combustion chamber 1240, the flow rate of air can be controlled and the flow rate of cooling air supplied through the effusion hole 211 can also be controlled. Thus, it is possible to optimally set the cooling efficiency of the transition piece 200.

For example, in order to further increase cooling efficiency at the position adjacent to the turbine, it is possible to increase the flow rate of cooling air supplied through the effusion hole 211 by reducing the diameter of the outer transition piece 220 adjacent to the turbine. In this case, since the flow rate of cooling air may be easily changed at a specific position, the cooling efficiency of the transition piece 200 can be enhanced.

The inner liner 110 has a first guide 140 to guide the flow direction of the cooling air introduced through the first opening 130 to the fuel injectors 1220 positioned at the inner end of the liner 100. The first guide 140 has an annular shape and is formed with a first slope 142. The first guide 140 is formed with the first slope 142 to give directionality (the direction of the arrows of FIG. 2) to cooling air. Although the first guide 140 is fixed by welding, it can also be fixed by other methods.

The inner transition piece 210 has a second guide 240 to guide the flow direction of the cooling air introduced through the second opening 230 to the turbine connected to the transition piece 200. The second guide 240 has an annular shape and is formed with a second slope 242. The second guide 240 is formed with the second slope 242 to give directionality (the direction of the arrows of FIG. 2) to cooling air.

Hereinafter, an apparatus for cooling a transition piece of a gas turbine according to another embodiment of the present disclosure will be described with reference to the accompanying drawings.

Figure 5:
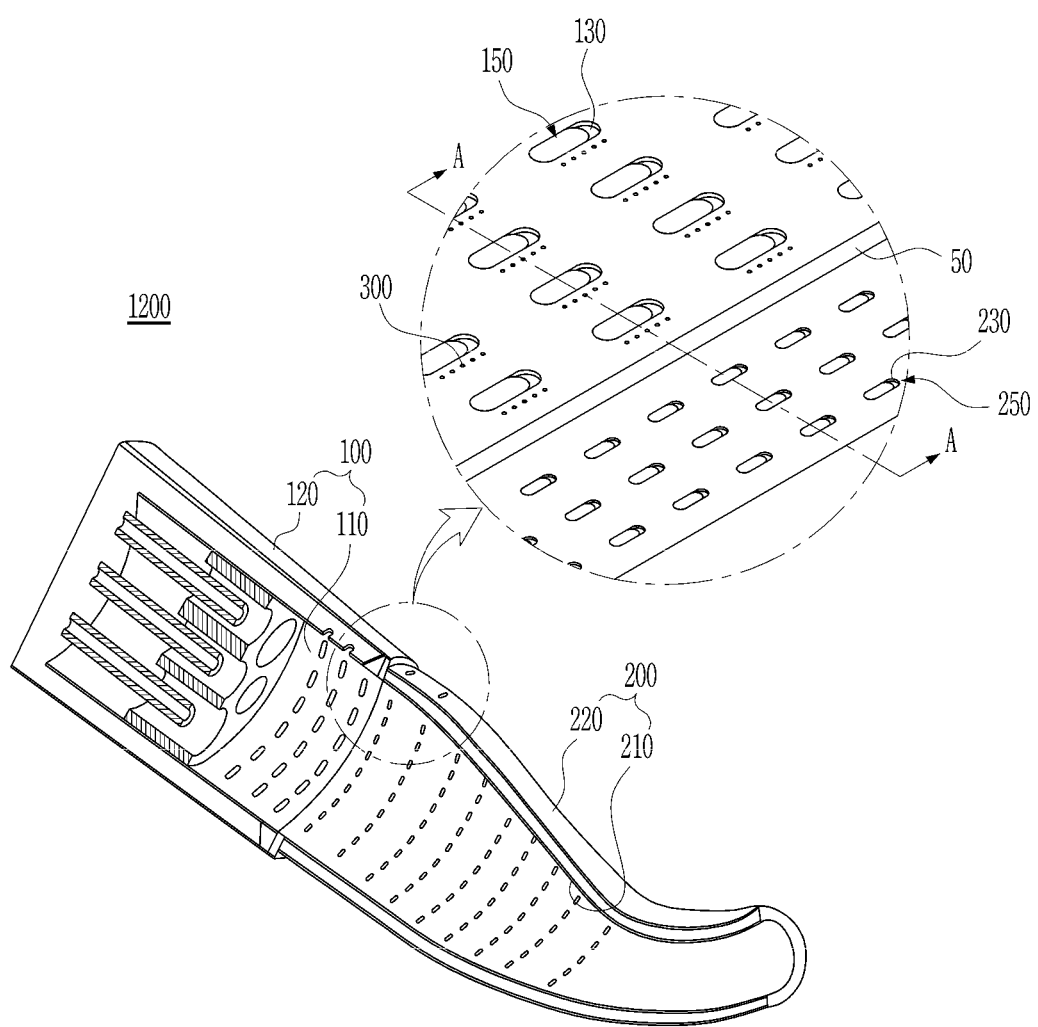
FIG. 5 is a cutaway perspective view of a combustor according to another embodiment of the present disclosure, including a callout showing a cross-section of the liner and transition piece each adjoining a connection part.
Figure 6:
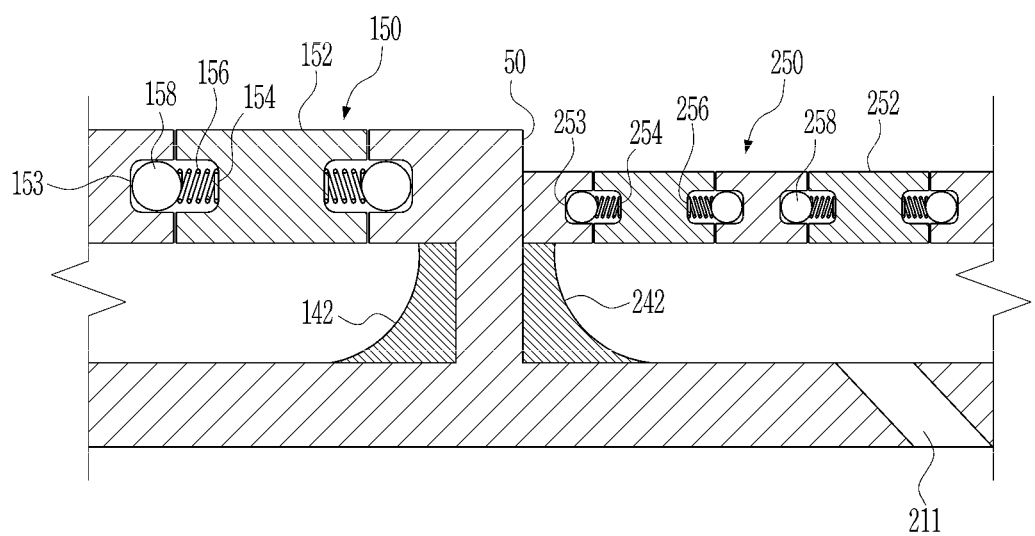
FIG. 6 is a cross-sectional view taken along line A-A of FIG. 5.

FIGS. 5 and 6 illustrate the structure of a combustor 1200 according to another embodiment of the present disclosure.

Referring to FIG. 5, the combustor 1200 includes a liner 100 that includes an inner liner 110 and an outer liner 120, a transition piece 200 that is connected at one end to one end of the liner 100 and at the other end to a turbine and includes an inner transition piece 210 and an outer transition piece 220, a liner sliding cover 150 provided to selectively adjust an opening degree of a first opening 130 that is open and elongated in the circumferential direction of the outer liner 120 so that cooling air is introduced through the first opening 130, and a transition piece sliding cover 250 provided to selectively adjust an opening degree of a second opening 230 that is open and elongated in the circumferential direction of the outer transition piece 220 so that cooling air is introduced through the second opening 230. Here, a connection part 50 is disposed between the liner 100 and the transition piece 200.

Unlike the above-described embodiment, an assembly or maintenance worker or operator (hereinafter referred as a worker) may control an amount of cooling air supplied into the liner 100 and the transition piece 200 according to the capacity of the turbine in the present embodiment, thereby performing the stable combustion of fuel injectors 1220 while stably cooling the transition piece 200.

Especially, upon determining the amount of cooling air supplied into the liner 100 and the transition piece 200 in the present embodiment, that is, whether the amount is relatively small or large, the worker may conveniently adjust the opening degrees of the first and second openings 130 and 230 by adjusting the position of the liner sliding cover 150 or the transition piece sliding cover 250.

Therefore, when the cooling performance of the transition piece 200 is reduced or it is intended to supply a larger amount of combustion air to the fuel injectors 1220, it is possible to easily control the amount of air without using a separate additional device.

Referring to FIG. 6, the liner sliding cover 150 includes a cover body 152 that has a shape corresponding to the upper surface of the first opening 130 and has a second slot 154 formed at a position facing a first slot 153 longitudinally formed in the first opening 130, an elastic member 156 that is fixed at one end to the second slot 154 and extends toward the first slot 153, and a ball 158 that is positioned in the first slot 153 and is pressed against the inner peripheral surface of the first slot 153 in the state in which one surface of the ball 158 is elastically supported by the elastic member 156.

The cover body 152 is positioned inside the first opening 130 and has an upper surface coinciding with the upper surface of the first opening 130, and the first and second slots 153 and 154 have a semicircular cross-sectional shape to accommodate the ball 158.

Since the ball 158 is always elastically supported in the direction of the first slot 153 by the elastic member 156, the cover body 152 is stably maintained at the current opening position unless the worker moves the cover body 152.

The elastic member 156 may be, for example, a coil spring.

When the opening degree of the cover body 152 is adjusted by the worker, the ball 158 allows the stable movement of the cover body 152 while coming into rolling contact with the inner peripheral surface of the first slot 153. The ball 158 consists of a plurality of balls arranged in the longitudinal direction of the cover body 152. Therefore, the cover body 152 can be stably moved forward or backward by manually gripping the upper and lower surfaces of the cover body 152.

When it is intended to increase the amount of cooling air supplied to the liner 100, the worker may conveniently control the amount of cooling air supplied to the fuel injectors 1220 by moving the cover body 152 in one direction.

The transition piece sliding cover 250 includes a cover body 252 that has a shape corresponding to the upper surface of the second opening 230 and has a second slot 254 formed at a position facing a first slot 253 longitudinally formed in the second opening 230, an elastic member 256 that is fixed at one end to the second slot 254 and extends toward the first slot 253, and a ball 258 that is positioned in the first slot 253 and is pressed against the inner peripheral surface of the first slot 253 in the state in which one surface of the ball 258 is elastically supported by the elastic member 256.

The transition piece sliding cover 250 controls an amount of air to be supplied at a fixed ratio for cooling rather than supplying the cooling air required for combustion, in which case the opening degree of the transition piece sliding cover 250 is adjusted such that an amount of air is supplied by about 10% since the amount of air supplied to the liner 100 is about 90% of the total amount of air.

The cover body 252 is positioned inside the second opening 230 and has an upper surface coinciding with the upper surface of the second opening 230, and the first and second slots 253 and 254 have a semicircular cross-sectional shape to accommodate the ball 258.

Since the ball 258 is always elastically supported in the direction of the first slot 253 by the elastic member 256, the cover body 252 is stably maintained at the current opening position unless the worker moves the cover body 252.

The elastic member 256 may be, for example, a coil spring.

When the opening degree of the cover body 252 is adjusted by the worker, the ball 258 allows the stable movement of the cover body 252 while coming into rolling contact with the inner peripheral surface of the first slot 253. The ball 258 consists of a plurality of balls arranged in the longitudinal direction of the cover body 252. Therefore, the cover body 252 can be stably moved forward or backward by manually gripping the upper and lower surfaces of the cover body 252.

The liner 100 and the transition piece 200 may each have a series of markers 300 formed in the longitudinal direction of the first and second openings 130 and 230, respectively, such that the worker may recognize amounts of movement of the liner sliding cover 150 and the transition piece sliding cover 250. Each marker may include a layer of luminous paint.

The markers 300 may allow an amount of air to be additionally indicated based on the opening degrees of the liner sliding cover 150 and the transition piece sliding cover 250. Therefore, the worker may easily and conveniently control an amount of air without calculating it. Since a luminous paint layer (not shown) is applied to each surface of the markers 300, the worker may easily perform a task even in low light conditions, thereby improving the workability of the worker. Therefore, the worker can easily control the amount of air supplied to the liner 100, thereby enhancing the efficiency of the turbine.

With reference to FIG. 3, according to an embodiment of the present disclosure, the first opening 130 has a flat-sided oval shape. The first opening 130 may include opposing side surfaces 131 communicating with an upper surface of the outer liner 120. The first slot 153 is longitudinally formed as a recess in each opposing side surface 131 and has a longitudinal length to accommodate the adjustment of the opening degree of the first opening 130 and to accommodate a lengthwise movement of the ball 158. The liner sliding cover 150 includes the cover body 152, the ball 158, and the elastic member 156. The second slot 154 of the cover body 152 faces the first slot 153, and the ball 158 is inserted in the first slot 153. The elastic member 156, which may include a coil spring or similar biasing mechanism, is fixed at one end to the second slot 154 and is configured at the other end to receive and to elastically support the ball 158 against an inner surface of the first slot 153 while pressing the ball 158 into the first slot 153. The first opening 130 may further include opposing end surfaces 132 that communicate with the opposing side surfaces 131. The opposing side surfaces 131 of the first opening 130 are configured such that, when the elastic member 156 is elastically supporting the ball 158 against the first slot 153, the opposing side surfaces 131 receive opposite side surfaces of the cover body 152. Meanwhile, the opposing end surfaces 132 of the first opening 130 are configured to receive one opposite end surface of the cover body 152 when the liner sliding cover 150 adjusts the opening degree of the first opening 130 to one extreme or the other. Here, one extreme movement of the liner sliding cover 150 represents a fully open position, and the other extreme movement of the liner sliding cover 150 represents a fully closed position. Therefore, the first opening 130 and the cover body 152 each have a flat-sided oval shape, and the first opening 130 is longer than the cover body 152.

With further reference to FIG. 3 and FIG. 6, according to an embodiment of the present disclosure, the second opening 230 has a flat-sided oval shape. The second opening 230 may include opposing side surfaces 231 communicating with an upper surface of the outer transition piece 220 and may further include opposing end surfaces 232 that communicate with the opposing side surfaces 231. Therefore, each of the liner sliding cover 150 and the transition piece sliding cover 250 includes the cover body (152, 252) having the second slot (154, 254) formed to face a corresponding first slot (153, 253), and the ball (158, 258) is inserted in the corresponding first slot such that the elastic member (156, 256) elastically supports the ball against the corresponding first slot.

Hereinafter, an apparatus for cooling a transition piece of a gas turbine according to a further embodiment of the present disclosure will be described with reference to the accompanying drawings.

Figure 7:
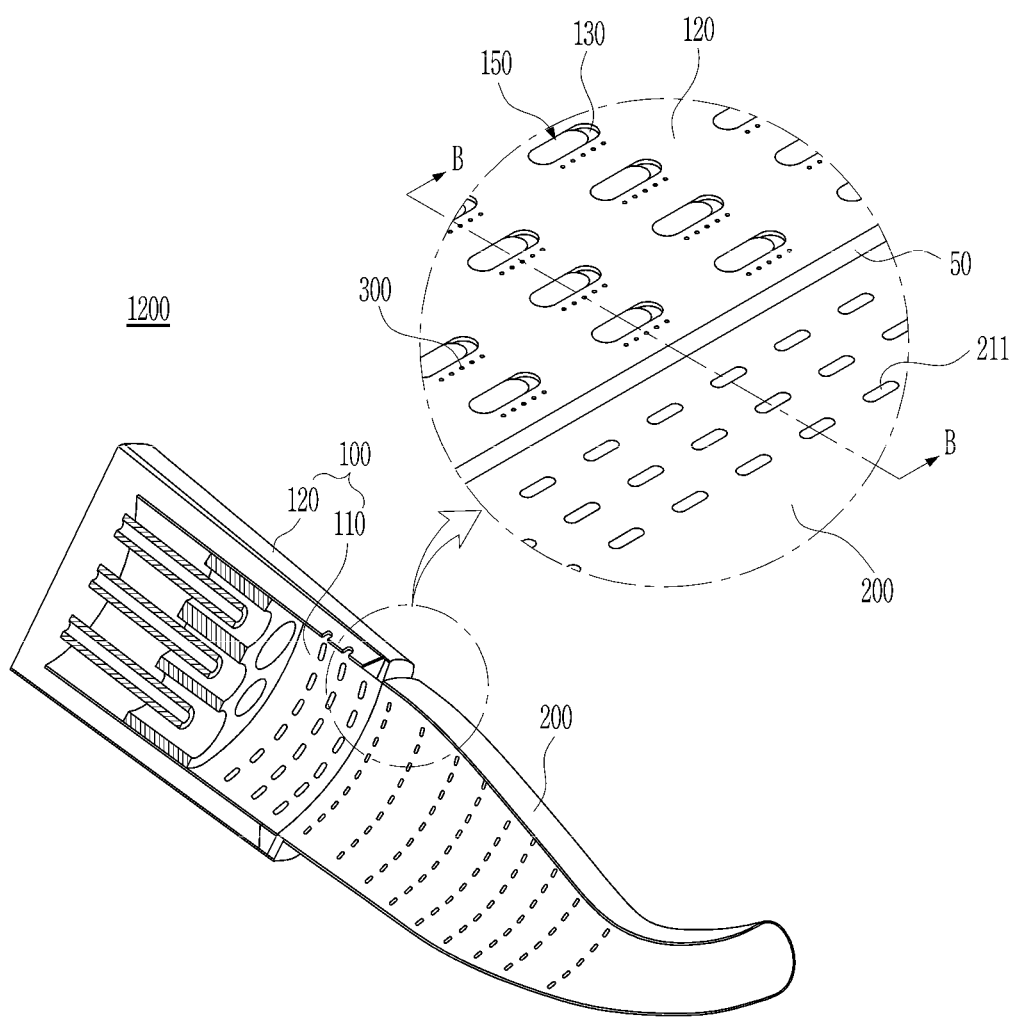
FIG. 7 is a cutaway perspective view of a combustor according to a further embodiment of the present disclosure, including a callout showing a cross-section of the liner and transition piece each adjoining a connection part.
Figure 8:
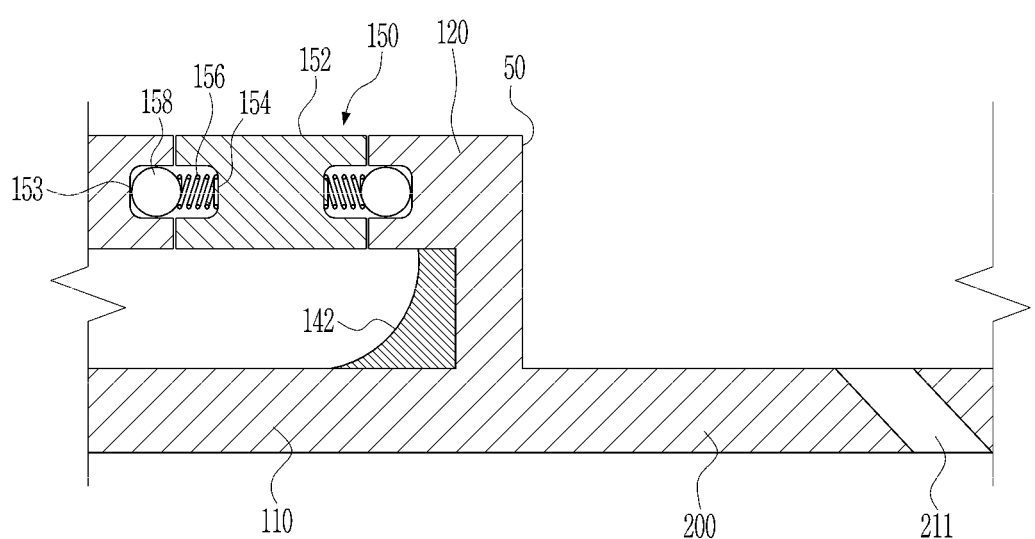
FIG. 8 is a cross-sectional view taken along line B-B of FIG. 7.

FIGS. 7 and 8 illustrate the structure of a combustor 1200 according to a further embodiment of the present disclosure.

Referring to FIG. 7, the combustor 1200 includes a liner 100 that includes an inner liner 110 and an outer liner 120, a transition piece 200 that is connected at one end to one end of the liner 100 and is connected at the other end to a turbine, and a liner sliding cover 150 provided to selectively adjust an opening degree of a first opening 130 that is open and elongated in the circumferential direction of the outer liner 120 so that cooling air is introduced through the first opening 130. Here, a connection part 50 is disposed between the liner 100 and the transition piece 200.

When it is intended to control an amount of cooling air supplied into the liner 100 in the present embodiment, a worker may conveniently adjust the opening degree of the first opening 130 by adjusting the position of the liner sliding cover 150. Therefore, when it is intended to supply a larger amount of combustion air to fuel injectors 1220, it is possible to easily control the amount of air without using a separate additional device.

Referring to FIG. 8, the liner sliding cover 150 includes a cover body 152 that has a shape corresponding to the upper surface of the first opening 130 and has a second slot 154 formed at a position facing a first slot 153 longitudinally formed in the first opening 130, an elastic member 156 that is fixed at one end to the second slot 154 and extends toward the first slot 153, and a ball 158 that is positioned in the first slot 153 and is pressed against the inner peripheral surface of the first slot 153 in the state in which one surface of the ball 158 is elastically supported by the elastic member 156.

The cover body 152 is positioned inside the first opening 130 and has an upper surface coinciding with the upper surface of the first opening 130, and the first and second slots 153 and 154 have a semicircular cross-sectional shape to accommodate the ball 158.

Since the ball 158 is always elastically supported in the direction of the first slot 153 by the elastic member 156, the cover body 152 is stably maintained at the current opening position unless the worker moves the cover body 152. The elastic member 156 may be, for example, a coil spring.

When the opening degree of the cover body 152 is adjusted by the worker, the ball 158 allows the stable movement of the cover body 152 while coming into rolling contact with the inner peripheral surface of the first slot 153. The ball 158 consists of a plurality of balls arranged in the longitudinal direction of the cover body 152. Therefore, the cover body 152 can be stably moved forward or backward by manually gripping the upper and lower surfaces of the cover body 152.

When it is intended to increase the amount of cooling air supplied to the liner 100, the worker may conveniently control the amount of cooling air supplied to the fuel injectors 1220 by moving the cover body 152 in one direction.

The transition piece 200 has an effusion hole 211 that is open to supply cooling air to the combustion chamber 1240.

In the present embodiment, the first opening 130 and the effusion hole 211 have differently sized opening areas, and the opening degree of the first opening 130 is greater than the opening area of the effusion hole 211. The first opening 130 serves to supply combustion air to the fuel injectors 1220 and simultaneously to supply cooling air for cooling of the liner due to hot gas produced during combustion. For example, to stably operate the fuel injectors 1220, the majority of the cooling air supplied through the first opening 130 is used as combustion air for combustion and only a portion of the supplied cooling air is used for cooling.

That is, assuming that the amount of cooling air introduced through the first opening 130 for a specific time is X1, the amount of cooling air introduced through the effusion hole 211 for the specific time is X2, and the sum of the amounts of cooling air introduced through the first opening 130 and the effusion hole 211 for the specific time is equal to one, the statements $X1>X2$ and $0<X2<0.5$ are true. Thereby, it is possible to efficiently control a flow rate of cooling air supplied into the liner 100 and a flow rate of cooling air supplied into the transition piece 200 and to stably operate and cool the fuel injectors 1220 together.

The liner 100 may have a marker 300 formed in the longitudinal direction of the first opening 130 such that the worker may recognize an amount of movement of the liner sliding cover 150. The marker 300 may allow an amount of air to be additionally indicated based on the opening degree of the liner sliding cover 150. Therefore, the worker may easily and conveniently control an amount of air without calculating it. Since a luminous paint layer (not shown) is applied to the surface of the marker 300, the worker may easily perform a task even in low light conditions, thereby improving the workability of the worker. Therefore, the worker can easily control the amount of air supplied to the liner 100, thereby enhancing the efficiency of the turbine.

As is apparent from the above description, the combustor and the gas turbine including the same according to the present disclosure are advantageous in that they can actively control an amount of air supplied to each of the liner and the transition piece by arbitrarily setting an injection amount of air, which is respectively supplied to the liner and the transition piece, as part of a specific ratio or by separately setting the injection amount of air.

Although the present disclosure has been described with respect to the specific embodiments, it will be apparent to those skilled in the art that various variations and modifications may be made by adding, changing, or removing components without departing from the spirit and scope of the disclosure as defined in the following claims, and these variations and modifications fall within the spirit and scope of the disclosure as defined in the appended claims.

What is claimed is:

1. A combustor comprising:
    a liner having one end configured to be connected to a fuel injector, the liner comprising an inner liner surrounded by an outer liner having a first opening that is elongated in a circumferential direction of the outer liner and is configured to introduce cooling air into an annular space between the inner liner and the outer liner;
    a liner sliding cover configured to adjust an opening degree of the first opening; and
    a transition piece connected at one end to the other end of the liner and configured to be connected to a turbine at the other end, the transition piece having an effusion hole configured to supply cooling air to a combustion chamber, the effusion hole having an opening degree that is less than the opening degree of the first opening,
    wherein the first opening has a flat-sided oval shape and comprises opposing side surfaces communicating with an upper surface of the outer liner; and a first slot longitudinally formed in each opposing side surface, the first slot having a longitudinal length to accommodate the adjustment of the opening degree of the first opening, and
    wherein the liner sliding cover comprises:
        a cover body having a second slot formed to face the first slot;
        a ball inserted in the first slot; and
        an elastic member fixed at one end to the second slot and configured at the other end to elastically support the ball against the first slot.

2. The combustor according to claim 1, further comprising:
    a connection part formed as an annular partition wall to define a gap between the inner liner and the transition piece and to define the annular space of the liner as an independent space.

3. The combustor according to claim 1, further comprising:
a first annular guide having a first slope formed on one side to guide the cooling air introduced through the first opening to the fuel injector.

4. The combustor according to claim 3, wherein the first annular guide extends from an annular partition wall that defines a gap between the inner liner and the transition piece and defines the annular space of the liner as an independent space, and wherein the first opening is disposed toward the annular partition wall.

5. The combustor according to claim 1, wherein the elastic member includes a coil spring.

6. The combustor according to claim 1,
wherein the first opening further includes opposing end surfaces that communicate with the opposing side surfaces,
wherein the opposing side surfaces of the first opening receive opposite side surfaces of the cover body when the elastic member elastically supports the ball against the first slot, and
wherein the opposing end surfaces of the first opening receive one opposite end surface of the cover body when the liner sliding cover adjusts the opening degree of the first opening to an extreme.

7. The combustor according to claim 6, wherein the first opening and the cover body each have a flat-sided oval shape, and the first opening is longer than the cover body.

8. The combustor according to claim 1, wherein an amount (X1) of cooling air introduced through the first opening for a specific time is greater than an amount (X2) of cooling air supplied through the effusion hole for the specific time.

9. The combustor according to claim 1, further comprising a series of markers formed in the outer liner in a longitudinal direction of the first opening that are arranged to visually indicate an amount of movement of the liner sliding cover corresponding to an adjusted opening degree of the first opening.

10. A combustor comprising:
a liner having one end configured to be connected to a fuel injector, the liner comprising an inner liner surrounded by an outer liner having a first opening that is elongated in a circumferential direction of the outer liner and is configured to introduce cooling air into an annular space between the inner liner and the outer liner;
a transition piece connected at one end to the other end of the liner and configured to be connected to a turbine at the other end, the transition piece comprising an inner transition piece surrounded by an outer transition piece having a second opening that is elongated in a circumferential direction of the outer transition piece and is configured to introduce cooling air into an annular space between the inner transition piece and the outer transition piece, the inner transition piece having an effusion hole disposed downstream of the second opening and configured to supply the cooling air introduced through the second opening to a combustion chamber;
a liner sliding cover configured to adjust an opening degree of the first opening to impart the first opening with a predetermined opening area; and
a transition piece sliding cover configured to adjust an opening degree of the second opening to impart the second opening with a predetermined opening area, such that the first and second openings have opening areas respectively set according to a specific ratio of the opening areas,
wherein the first opening has a flat-sided oval shape and comprises opposing side surfaces communicating with an upper surface of the outer liner; and a first slot longitudinally formed in each opposing side surface, the first slot having a longitudinal length to accommodate the adjustment of the opening degree of the first opening, and
wherein the liner sliding cover comprises:
a cover body having a second slot formed to face the first slot;
a ball inserted in the first slot; and
an elastic member fixed at one end to the second slot and configured at the other end to elastically support the ball against the first slot.

11. The combustor according to claim 10, wherein the annular space between the inner transition piece and the outer transition piece has a reduced cross-sectional area toward the turbine so as to control a flow rate of the cooling air supplied through the effusion hole.

12. The combustor according to claim 10, further comprising:
a first annular guide having a first slope formed on one side to guide the cooling air introduced through the first opening to the fuel injector; and
a second annular guide having a second slope formed on one side to guide the cooling air introduced through the second opening to the turbine.

13. The combustor according to claim 12, wherein the first and second annular guides extend from an annular partition wall that defines a gap between the inner liner and the transition piece and defines the annular spaces of the liner and the transition piece as independent spaces, and wherein the first and second openings are respectively disposed toward the annular partition wall.

14. The combustor according to claim 10,
wherein the second opening has a flat-sided oval shape and comprises
opposing side surfaces communicating with an upper surface of the outer transition piece; and
a first slot longitudinally formed in each opposing side surface of the second opening, the first slot of the second opening having a longitudinal length to accommodate the adjustment of the opening degree of the second opening.

15. The combustor according to claim 14, wherein the transition piece sliding cover comprises:
a cover body having a second slot formed to face the first slot of the second opening;
a ball inserted in the first slot first slot of the second opening; and
an elastic member fixed at one end to the second slot of the transition piece sliding cover and configured at the other end to elastically support the ball against the first slot of the second opening.

16. The combustor according to claim 10, further comprising:
a first series of markers formed in the outer liner in a longitudinal direction of the first opening that are arranged to visually indicate an amount of movement of the liner sliding cover corresponding to an adjusted opening degree of the first opening; and
a second series of markers formed in the outer transition piece in a longitudinal direction of the second opening that are arranged to visually indicate an amount of movement of the transition piece sliding cover corresponding to an adjusted opening degree of the second opening.

17. The combustor according to claim 10, wherein an amount (X1) of cooling air introduced through the first opening for a specific time is greater than an amount (X2) of cooling air introduced through the second opening for the specific time.

18. A gas turbine comprising:
a compressor to compress air, a combustor to produce combustion gas by mixing the compressed air with fuel for combustion, and a turbine rotated by the combustion gas to generate power, the combustor comprising:
a liner having one end configured to be connected to a fuel injector, the liner comprising an inner liner surrounded by an outer liner having a first opening that is elongated in a circumferential direction of the outer liner and is configured to introduce cooling air into an annular space between the inner liner and the outer liner;
a liner sliding cover configured to adjust an opening degree of the first opening;
a transition piece connected at one end to the other end of the liner and configured to be connected to the turbine at the other end, the transition piece comprising an inner transition piece surrounded by an outer transition piece having a second opening that is elongated in a circumferential direction of the outer transition piece and is configured to introduce cooling air into an annular space between the inner transition piece and the outer transition piece, the inner transition piece having an effusion hole configured to supply the cooling air introduced through the second opening to a combustion chamber;
a liner sliding cover configured to adjust an opening degree of the first opening to impart the first opening with a predetermined opening area; and
a transition piece sliding cover configured to adjust an opening degree of the second opening to impart the second opening with a predetermined opening area, such that the first and second openings have opening areas respectively set according to a specific ratio of the opening areas,
wherein the first opening has a flat-sided oval shape and comprises opposing side surfaces communicating with an upper surface of the outer liner; and a first slot longitudinally formed in each opposing side surface, the first slot having a longitudinal length to accommodate the adjustment of the opening degree of the first opening, and
wherein the liner sliding cover comprises:
a cover body having a second slot formed to face the first slot;
a ball inserted in the first slot; and
an elastic member fixed at one end to the second slot and configured at the other end to elastically support the ball against the first slot.

* * * * *